(12) United States Patent
Tsubone et al.

(10) Patent No.: US 12,108,313 B2
(45) Date of Patent: Oct. 1, 2024

(54) CALLING SYSTEM AND METHOD FOR OFF-ROAD VEHICLE

(71) Applicant: KAWASAKI MOTORS, LTD., Akashi (JP)

(72) Inventors: Toshiyuki Tsubone, Kobe (JP); Shuichi Miyanishi, Kobe (JP); Tokishin Nishinaka, Kobe (JP); Nobuyuki Nishiguchi, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 518 days.

(21) Appl. No.: 17/379,098

(22) Filed: Jul. 19, 2021

(65) Prior Publication Data

US 2023/0018229 A1   Jan. 19, 2023

(51) Int. Cl.
*H04W 4/02*     (2018.01)
*H04W 4/029*    (2018.01)
*H04W 4/46*     (2018.01)

(52) U.S. Cl.
CPC ............. *H04W 4/46* (2018.02); *H04W 4/029* (2018.02)

(58) Field of Classification Search
CPC ......... H04W 4/46; H04W 4/029; H04W 4/20; H04W 4/90; H04W 4/02
USPC ............................................................ 701/1
See application file for complete search history.

(56) References Cited

U.S. PATENT DOCUMENTS

| | | | | |
|---|---|---|---|---|
| 7,388,512 B1 * | 6/2008 | Moorer, Jr. | ............. | B63C 11/26 367/141 |
| 9,499,124 B2 | 11/2016 | Kawakatsu et al. | | |
| 10,308,115 B2 | 6/2019 | Kawakatsu et al. | | |
| 2004/0048598 A1 * | 3/2004 | Gagnon | ................. | G08G 1/205 455/427 |
| 2005/0221759 A1 * | 10/2005 | Spadafora | .............. | G08G 1/093 455/39 |
| 2022/0030408 A1 * | 1/2022 | Zhang | .................. | G08B 25/009 |
| 2023/0188642 A1 * | 6/2023 | Tsubone | ............ | H04M 1/72412 455/456.3 |

* cited by examiner

*Primary Examiner* — Shardul D Patel
(74) *Attorney, Agent, or Firm* — Alleman Hall & Tuttle LLP

(57) ABSTRACT

A calling system for off-road vehicles includes processing circuitry. The processing circuitry is configured to: obtain location information indicating a location of a first off-road vehicle; obtain a specific state signal indicating that the first off-road vehicle is in a given specific state; and cause a first wireless communicator of the first off-road vehicle to, based on the specific state signal, wirelessly transmit a calling signal containing the location information, wherein the wireless transmission of the calling signal by the first wireless communicator is performed using a wireless communication technology in which the calling signal transmitted from the first wireless communicator is received directly by a second wireless communicator of a second off-road vehicle.

19 Claims, 7 Drawing Sheets

CALLING SYSTEM AND METHOD FOR OFF-ROAD VEHICLE

BACKGROUND

Technical Field

The present disclosure relates to a calling system and method for off-road vehicles.

Description of the Related Art

Off-road vehicles for travel on rough terrains such as wildlands and bumpy deserts are known. The off-road vehicles can travel freely on a vast land devoid of any defined routes.

SUMMARY

A calling system for off-road vehicles according to one aspect of the present disclosure includes processing circuitry. The processing circuitry is configured to: obtain location information indicating a location of a first off-road vehicle; obtain a specific state signal indicating that the first off-road vehicle is in a given specific state; and cause a first wireless communicator of the first off-road vehicle to, based on the specific state signal, wirelessly transmit a calling signal containing the location information, wherein the wireless transmission of the calling signal by the first wireless communicator is performed using a wireless communication technology in which the calling signal transmitted from the first wireless communicator is received directly by a second wireless communicator of a second off-road vehicle.

A calling method for off-road vehicles according to one aspect of the present disclosure includes: obtaining location information indicating a location of a first off-road vehicle by processing circuitry; obtaining a specific state signal by the processing circuitry, the specific state signal indicating that the first off-road vehicle is in a given specific state; and by the processing circuitry, causing a first wireless communicator of the first off-road vehicle to, based on the specific state signal, wirelessly transmit a calling signal containing the location information.

DETAILED DESCRIPTION OF THE EMBODIMENTS

Hereinafter, exemplary embodiments will be described with reference to the drawings.

Figure 1:
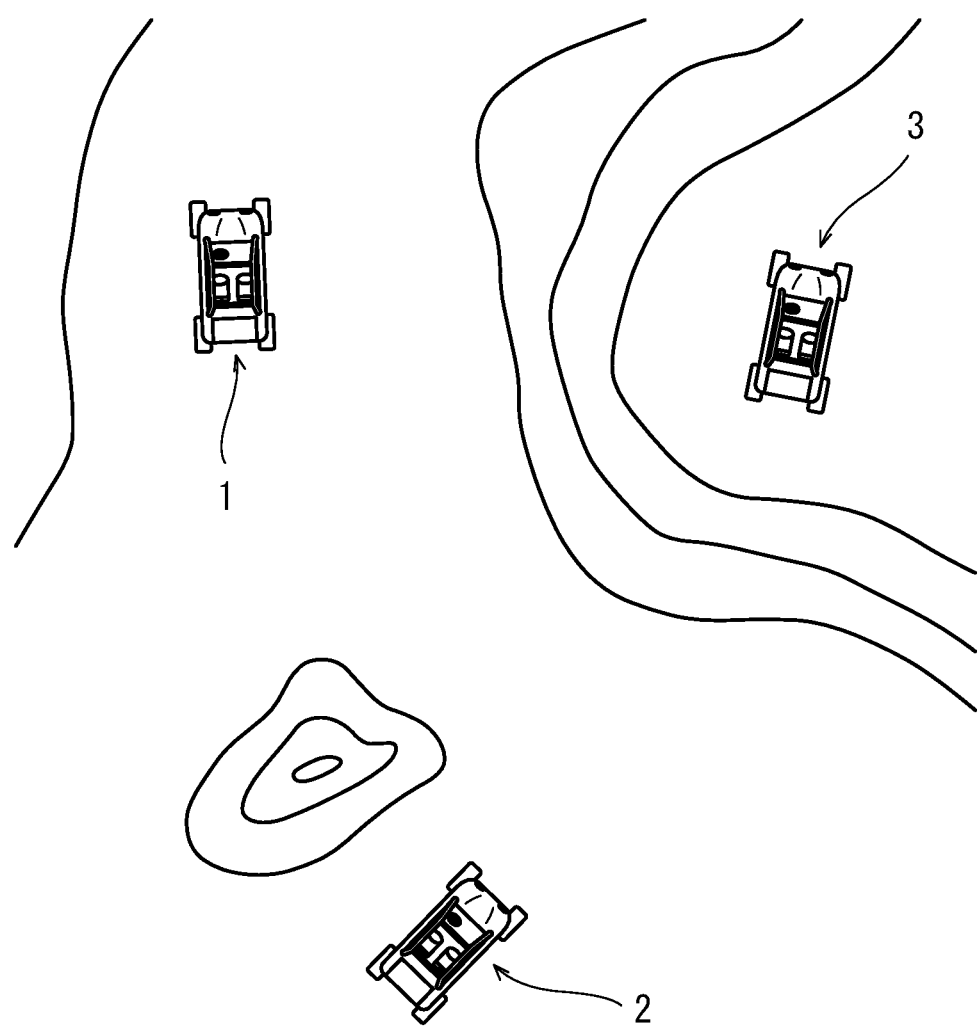
FIG. 1 is a plan view showing off-road vehicles traveling on a rough terrain and their vicinity as viewed from above.

FIG. 1 is a plan view showing an off-road vehicle 1 traveling on a rough terrain and its vicinity as viewed from above. Off-road vehicles may be referred to as "utility vehicles". In FIG. 1, contour lines of the terrain are depicted. As shown in FIG. 1, the off-road vehicle 1 travels freely on a vast rough terrain devoid of any defined routes. During travel on a vast rough terrain area such as a dessert or rocky area, the off-road vehicle 1 could be outside a communication area covered by a base station of a mobile phone of the driver of the off-road vehicle 1. In such a situation, the driver of the off-road vehicle 1 has difficulty in establishing communication with other people. Thus, in case that the off-road vehicle 1 enters a specific state, the driver could have difficulty in informing someone of the occurrence of the specific state. On a terrain such as a forest or rocky area, the presence of many obstacles could make it difficult for drivers of other off-road vehicles 2 and 3 traveling in the vicinity of the off-road vehicle 1 to visually recognize the off-road vehicle 1. An off-road vehicle according to an exemplary embodiment includes a calling unit 20 for communicating the state of the off-road vehicle to another vehicle. The details of the calling unit 20 will be described later.

Figure 2:
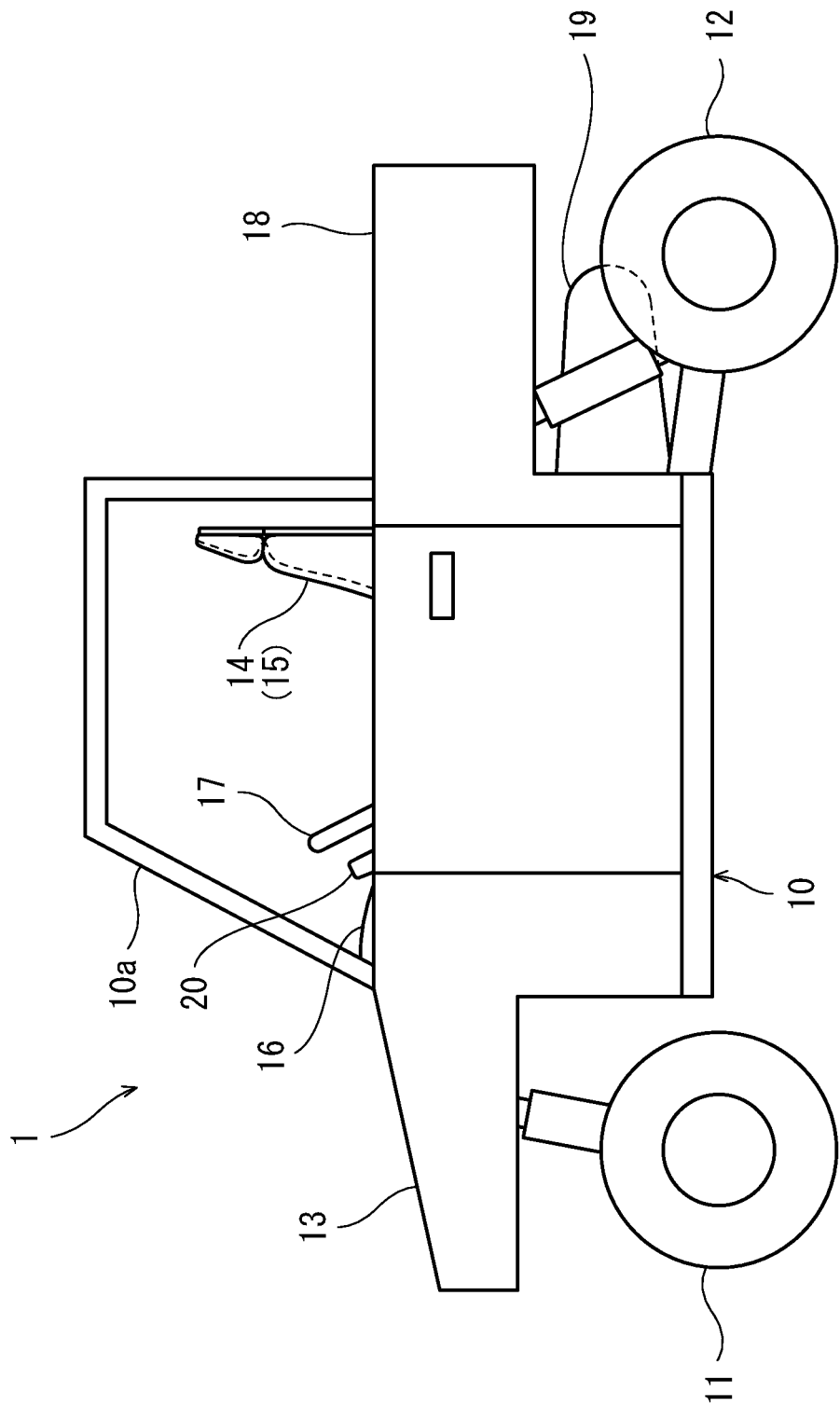
FIG. 2 is a side view of an off-road vehicle.

FIG. 2 is a side view of the off-road vehicle 1. As shown in FIG. 2, the off-road vehicle 1 includes a vehicle body frame 10, a pair of left and right front wheels 11 supporting a front portion of the vehicle body frame 10, and a pair of left and right rear wheels 12 supporting a rear portion of the vehicle body frame 10. The tires of the front and rear wheels 11 and 12 are balloon tires for travel on rough terrains. The space between the left and right front wheels 11 is covered by a hood 13 from above. A driver seat 14 and a passenger seat 15 supported by the vehicle body frame 10 are located behind the hood 13.

The vehicle body frame 10 is a pipe frame made up of pipes connected together. The vehicle body frame 10 includes a cabin frame 10a surrounding the interior space in which the driver and passenger seats 14 and 15 are located. The interior space surrounded by the cabin frame 10a is exposed to the external environment. A dash panel 16 is located ahead of the driver and passenger seats 14 and 15. A handle 17 is mounted on the dash panel 16 and projects toward the driver seat 14.

The vehicle body frame 10 supports a cargo bed 18 located behind the cabin frame 10a, and the cargo bed 18 defines a recessed loading space open to the external environment. A power unit 19 is mounted on the vehicle body frame 10 and located below the cargo bed 18. The power unit 19 includes an internal combustion engine, an electric motor, or a combination of an internal combustion engine and electric motor as a prime mover, and may include a transmission. The power unit 19 outputs rotational power for driving both the front and rear wheels 11 and 12 or either the front or rear wheels 11 or 12.

In this embodiment, the off-road vehicle 1 includes a calling unit 20 serving as at least a part of a calling system 100. In this embodiment, the calling unit 20 is mounted on the dash panel 16. Specifically, the calling unit 20 is removably mounted on the off-road vehicle 1. In this embodiment, the calling unit 20 includes a display 24 at a location that allows the display 24 to be viewed at least from the driver seat 14. The display 24 will be described later. Other off-road vehicles such as the off-road vehicles 2 and 3 include the same calling unit 20 and may have the same configuration as the off-road vehicle 1 described above.

Figure 3:
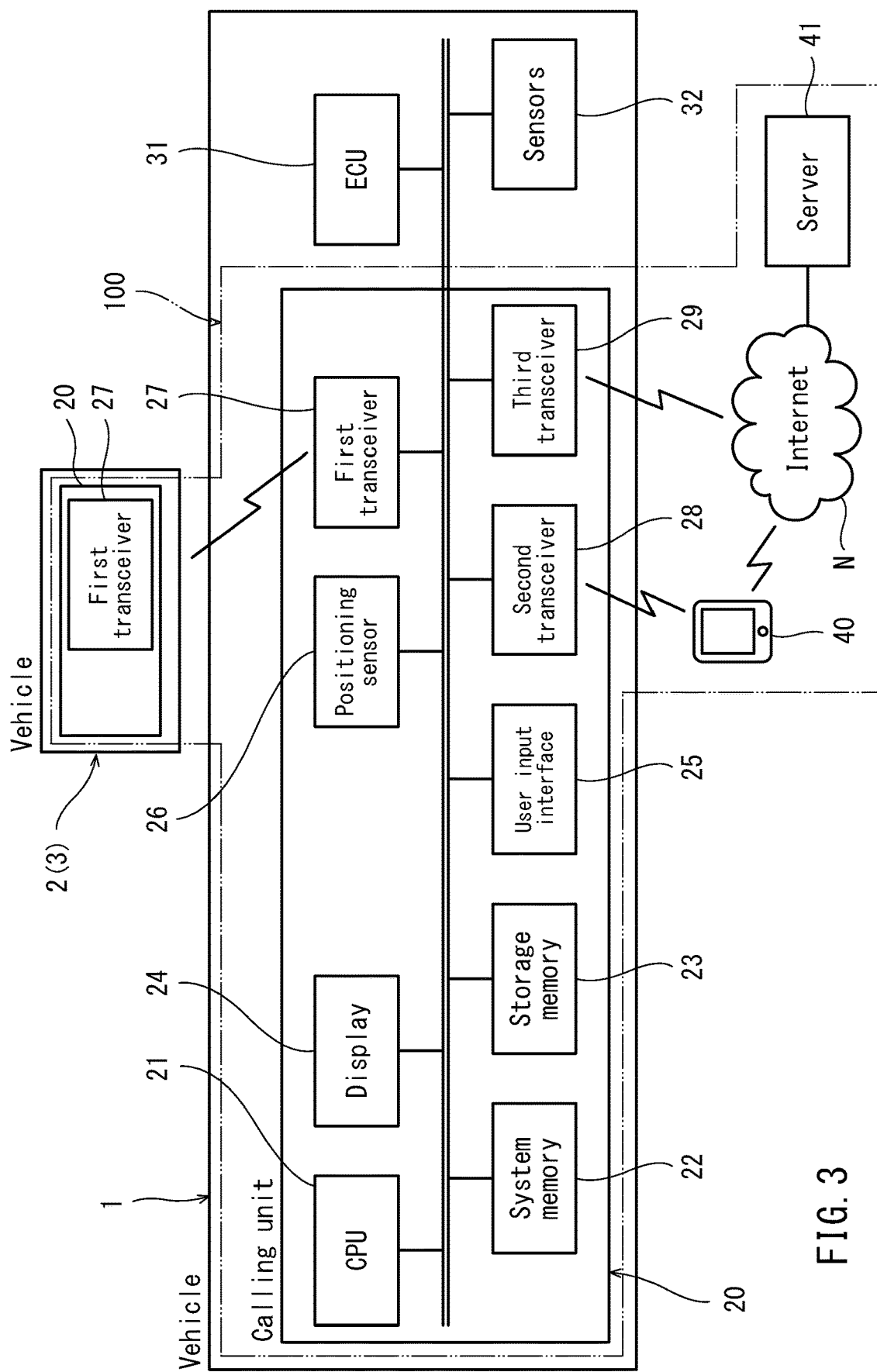
FIG. 3 is a block diagram of a calling system for off-road vehicles.

FIG. 3 is a block diagram of the calling system 100 for off-road vehicles. As shown in FIG. 3, the calling system 100 includes at least one memory storing a calling program and at least one processor configured to execute the calling program. For example, the calling system 100 includes the calling unit 20. The calling unit 20 includes a memory storing the calling program and a processor configured to execute the calling program. Specifically, the calling unit 20 includes a CPU 21, a system memory 22, a storage memory 23, a display 24, a user input interface 25, a positioning sensor 26, a first transceiver 27, a second transceiver 28, and a third transceiver 29.

The CPU 21 is a central processing unit. The system memory 22 may include a RAM. The storage memory 23 may include a ROM. The ROM prestores identification information of the vehicle 1. The storage memory 23 may include a hard disk and/or a flash memory. The storage memory 23 prestores the calling program. The configuration in which the CPU 21 executes the calling program retrieved into the system memory 22 is an example of processing circuitry.

The display 24 is a type of user output interface and may be a display device such as a liquid crystal display, an organic EL display, an AR (Augmented Reality) display, a head-mounted display, or an LED. The user input interface 25 is an interface operated by the user to input information. The user input interface 25 may be a touch panel of the display 24, a button, or a lever.

The positioning sensor 26 is a sensor that detects the current location coordinates of the off-road vehicle 1. The positioning sensor 26 may be a satellite positioning sensor such as a GPS sensor. The current location coordinates of the off-road vehicle 1 may be calculated based on the moving distance calculated from the travel speed and the moving direction calculated from the acceleration.

The first transceiver 27 communicates wirelessly and directly with the first transceivers 27 of other off-road vehicles such as the off-road vehicles 2 and 3 and/or any other like communication devices without intervention of any base station. For example, the first transceiver 27 may be configured to perform the wireless communication by RF (Radio Frequency) communication. The frequency range of the wireless communication performed by the first transceiver 27 may be, for example, from 20 kHz to 300 GHz.

The first transceiver 27 may perform communication conforming to standards defined by MURS (Multi-Use Radio Service). The first transceiver 27 may have a power limit of 2 W and transmit and receive electric waves within a selected narrow region of the VHF range. The first transceiver 28 can perform two-way wireless communication by exchanging electric waves with other first transceivers 27 conforming to the same communication standards. For example, the first transceiver 27 may modulate driver voice information collected by an attached microphone, provide the modulated voice information to a carrier wave, and transmit the carrier wave carrying the voice information to the surroundings through an antenna. The first transceiver 27 may demodulate voice information carried by a carrier wave received through the antenna and output the demodulated voice information through an attached speaker. Thus, two PWCs located within the range of VHF electric wave reception can establish two-way voice communication.

The first transceiver 27 may be configured to modulate and demodulate information other than voice in order to establish two-way communication. The first transceiver 27 can provide location information detected by the positioning sensor 26 to a carrier wave and transmit the carrier wave carrying the location information to the other vehicles 2 and 3. In other words, the CPU 21 of the surrounding recognition support unit 20 can obtain location information of the other PWCs 2 and 3 via the first transceiver 27. The first transceiver 27 may provide to a carrier wave the identification information uniquely assigned to the calling unit 20 and transmit the carrier wave carrying the identification information to the other vehicles 2 and 3.

The range of electric wave exchange between the first transceivers 27 is set wider than the range of electric wave exchange between the second transceivers 28 described later. For example, the radius of the range of electric wave exchange between the first transceivers 27 may be set to 1 mile.

The above wireless communication range of the first transceivers 27 is merely an example, and other communication standards and other communication frequencies may be used. That is, it is only required that the transceivers of different vehicles can perform two-way exchange according to the same communication standards.

The second transceiver 28 communicates wirelessly and directly with a portable information terminal 40 such as a smartphone or smart watch without intervention of any base station. For example, the second transceiver 28 may be configured to wirelessly communicate with the portable information terminal 40 by a near field wireless communication protocol such as Bluetooth or Wi-Fi. For example, the radius of the range of electric wave exchange of the second transceiver 28 is set below 10 m. The presence of the portable information terminal 40 within the range of electric wave exchange can be known through electric wave exchange of the second transceiver 28 with the portable information terminal 40. The portable information terminal 40 includes a processor and a memory. The portable information terminal 40 is mounted on the off-road vehicle 1 or carried by the driver of the off-road vehicle 1 and moves together with the off-road vehicle 1. The portable information terminal 40 is wirelessly connectable to a public network N such as the Internet via a base station and can communicate with a server 41. The server 41 includes a processor and a memory.

The third transceiver 29 is wirelessly connectable to the public network N such as the Internet via a base station antenna which is a stationary installation, and can communicate with the server 41. Thus, the calling unit 20 may be connected to the network N via the portable information terminal 40. The third transceiver 29 may be configured to exchange electric waves with a satellite. In this case, the third transceiver 29 is connectable to the network N even when the calling unit 20 is outside the range of electric wave exchange of the base station antenna located on shore.

Although in the illustrated configuration the calling unit 20 includes different transceivers, the calling unit 20 may include only one transceiver insofar as the calling unit 20 can transmit signals to other vehicles. The second and third transceivers 28 and 29 may be omitted, and the communication may be established using the first transceiver 27. The first and third transceivers 27 and 29 may be omitted, and the communication may be established using the second transceiver 28. The first and second transceivers 27 and 28 may be omitted, and the communication may be established using the third transceiver 29.

The off-road vehicle 1 includes an ECU (Electronic Control Unit) 31 and sensors 32 in addition to the calling unit 20. The ECU 31 is a prime mover controller that includes a processor and a memory and that controls a prime mover E and other devices based on signals received from the sensors 32. The sensors 32 may include an accelerator sensor that detects the acceleration demand from the driver of the off-road vehicle 1, a sensor that detects the rotational speed of the prime mover E, a sensor that detects the rotational speed of the prime mover of the power unit 19, a sensor that detects the level of an energy source such as a fuel or battery, a sensor that detects the travel speed of the off-road vehicle 1, a sensor that detects the acceleration of the off-road vehicle 1, a sensor that detects the position of the off-road vehicle 1, or any combination of these sensors. The sensors 32 may include a sensor that detects abnormalities in the operation of the prime mover or that detects the types of abnormalities (error codes) in the other sensors or the wiring.

The ECU 31 and sensors 32 are connected together by a CAN (Controller Area Network) line, and the calling unit 20 is connected to the CAN line. To removably mount the calling unit 20 on the vehicle body frame 10, the off-road vehicle 1 may include a communication connection terminal for electrical connection between the calling unit 20 and ECU 31, an electricity supply connection terminal for electricity supply to the calling unit 20, or a combination of these connection terminals. The communication connection terminal and the electricity supply communication terminal may be integral with each other.

The ECU 31 determines whether the off-road vehicle 1 is in a specific state based on, for example, detection signals of the sensors 32. Upon determining that the off-road vehicle 1 is in the specific state, the ECU 31 transmits a specific state signal to the calling unit 20. There may be different types of specific states in regard to which the ECU makes determination. The specific state is a state meeting a condition under which a calling signal should be transmitted to another vehicle. The specific state may be a state meeting a signal-transmitting condition under which a calling signal should be transmitted to an entity other than the off-road vehicle 1 or a state where the calling unit 20 is ready to transmit the calling signal.

For example, the specific state may be a trouble state or an abnormal state. For example, the ECU 31 may determine whether the off-road vehicle 1 is in the abnormal state. In this case, the ECU 31 transmits an abnormal state signal to the calling unit 20 upon determining that the off-road vehicle 1 is in the abnormal state. The abnormal state may be a failed state where the prime mover E does not operate properly, a state where the off-road vehicle 1 has remained overturned for over a given period of time, or a state where the level of the energy source such as a fuel or battery for the prime mover E of the power unit 19 is below a given value. The specific state may be a state where a warning lamp is lit on an instrument panel of the off-road vehicle 1. Specifically, the condition for lighting of the warning lamp may include a condition that certain prime mover failure or wiring abnormality has occurred or may include a condition that an abnormality of an electronic component has occurred or an abnormal value has been detected. For example, the electronic component subject to abnormality detection may include an exhaust gas sensor, an air-intake sensor, an engine oil-pressure sensor, an engine coolant sensor, an ignition sensor, a throttle sensor, a battery voltage sensor, or a rotational speed sensor. The specific state may be a so-called "limp home" state where control for limiting the output of the prime mover E has been carried out to address the abnormal state described above. The specific state may be a state of a device other than the prime mover E and may be, for example, a state where an abnormal decrease in the tire pneumatic pressure has been detected by a pneumatic pressure sensor or where an abnormality related to vehicle body control, such as suspension control abnormality, has been detected.

The specific state may be a state other than the abnormal state. For example, the specific state may be a state where the driver has issued an instruction to transmit a calling signal to another vehicle by operating the user input interface 25. For example, the off-road vehicle 1 may include a calling switch operable by the driver to input an instruction to transmit a calling signal. In this case, the ECU 31 may determine that the specific state has occurred in response to an operation of the calling switch by the driver. For example, the specific state may include a state where the driver can move by the driver's own vehicle but wants to be picked up by another vehicle.

The determination of whether the off-road vehicle 1 is in the specific state may be performed by the CPU 21 of the calling unit 20 rather than by the ECU 31. In this case, upon determining that the off-road vehicle 1 is in the specific state, the CPU 21 of the calling unit 20 generates a specific state signal, and thus the calling unit 20 obtains the specific state signal within itself. The sensor used for determination of whether the off-road vehicle 1 is in the specific state may be a sensor of the calling unit 20 rather than any of the sensors 32 of the off-road vehicle 1. The CPU 21 may determine whether the specific state has occurred based on pieces of information provided from the various sensors 32 through CAN communication. In the configuration where the CPU 21 determines whether the specific state has occurred independently of the ECU 31, whether the specific state has occurred can be determined based on conditions different from those based on which the ECU 31 makes determination as to abnormalities.

The calling unit 20 may be configured to, upon wirelessly transmitting a calling signal, inform the driver of the wireless calling signal transmission using a user output interface such as the display 24. The calling unit 20 can allow the calling signal to contain information obtained by the positioning sensor 26, information obtained by the ECU 31 and indicating the type of the specific state, or a combination of these pieces of information. The calling unit 20 can allow the calling signal to contain information such as voice or text information input to the user input interface 25.

The calling unit 20 is configured to receive a calling signal from another vehicle through the first transceiver 27. The calling unit 20 is configured to, upon receiving a calling signal from another vehicle, inform the driver of the calling signal reception using a user output interface such as the display 24.

Other off-road vehicles such as the off-road vehicles 2 and 3 include the same calling unit 20 as the off-road vehicle 1. In FIG. 3, for simplicity of illustration, only the first transceiver 27 is shown as a component of the calling unit 20 of the off-road vehicle 2, and the other components of the calling unit 20 of the off-road vehicle 2 are omitted.

Hereinafter, the off-road vehicle 1 that transmits a calling signal is referred to also as "signal-transmitting vehicle", and the off-road vehicle 2 that receives the calling signal is referred to also as "signal-receiving vehicle". The calling unit 20 of the first off-road vehicle 1 is referred to also as "signal-transmitting calling unit", and the calling unit 20 of the second off-road vehicle 2 is referred to also as "signal-receiving calling unit". The first transceiver 27 of the calling unit 20 of the first off-road vehicle 1 serves as a first wireless communicator of the off-road vehicle 1, and the first transceiver 27 of the calling unit 20 of the second off-road vehicle 2 serves as a second wireless communicator of the second off-road vehicle 2.

Figure 4:
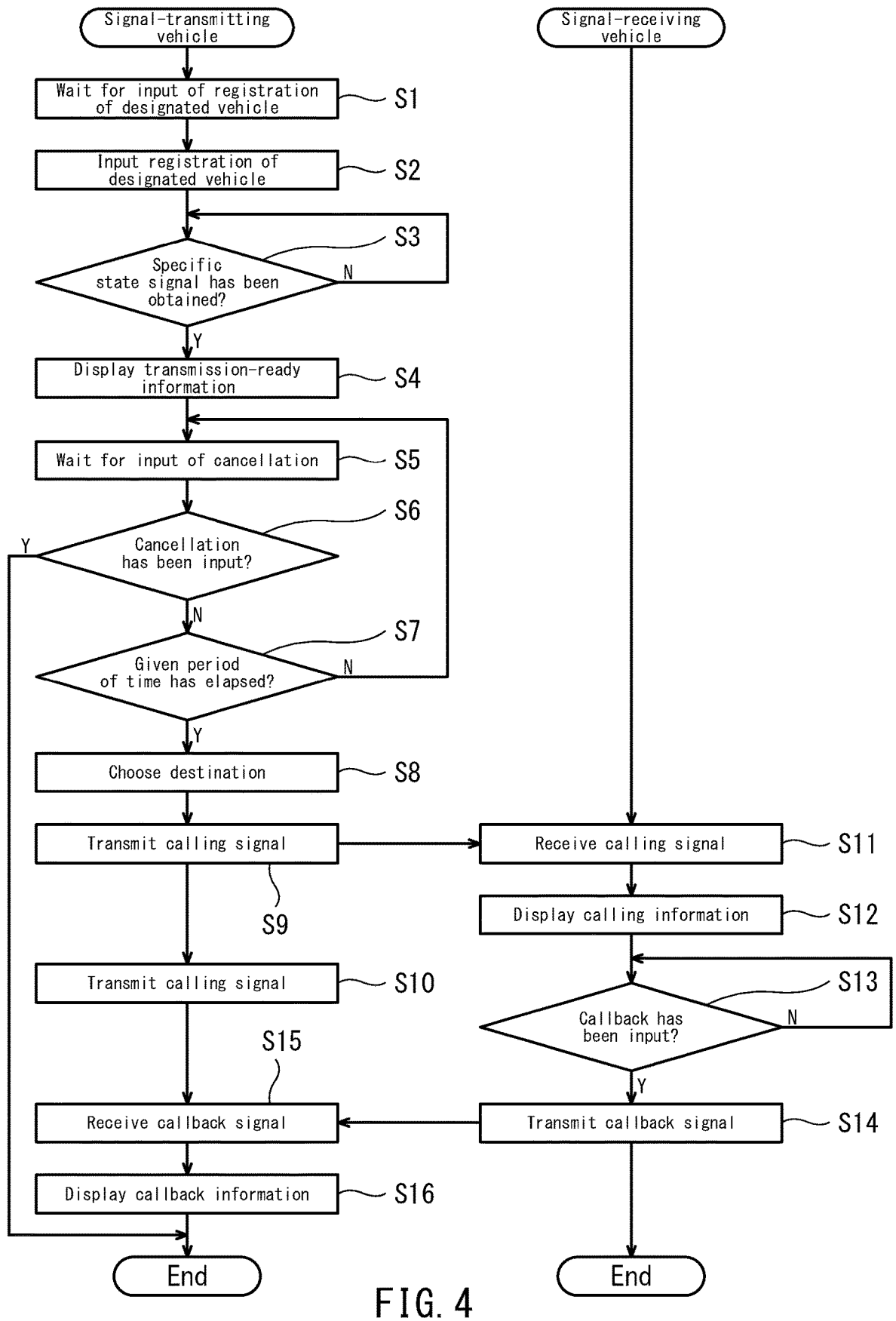
FIG. 4 is a flowchart illustrating a process of the calling system of FIG. 3.

FIG. 4 is a flowchart illustrating a process of the calling system 100 of FIG. 3. In the calling system 100, the process described hereinafter is mainly carried out by the CPU 21 executing various commands of the calling program in the calling unit 20. The process will be described in line with FIG. 4 with reference to FIG. 3 and other figures. In FIG. 4, the first off-road vehicle 1 is referred to as "signal-transmitting vehicle", and the second off-road vehicle 2 is referred to as "signal-receiving vehicle".

As shown in FIG. 4, the CPU 21 of the first calling unit 20 of the signal-transmitting vehicle 1 (first off-road vehicle 1) causes the display 24 to display a user input screen in response to a given input operation and waits for a user input that commands the CPU 21 to register one or more other off-road vehicles as designated vehicles which are candidates for signal-receiving vehicles (step S1). The CPU 21 may wait for a user input that commands the CPU 21 to register a group consisting of the one or more designated vehicles. The CPU 21 may wait for a user input that commands the CPU 21 to register one of the designated vehicles of the group as a group leader.

The user operates the user input interface 25 of the calling unit 20 to input registration of the designated vehicles (step S2). The user may input registration of the group and/or the group leader. The CPU 21 stores information about the registered designated vehicles into the storage memory 23. Steps S1 and S2 can be carried out at appropriate times according to the user's demand. Steps S1 and S2 may be skipped.

The registration of the designated vehicle may be accomplished by two-way exchange between the first transceivers 28. The CPU 21 can receive identification information of other vehicles and other pieces of information such as the location, moving direction, and moving speed of the other vehicles through the first transceiver 28. For example, in step S1, the CPU 21 may cause the display 24 to display the location information of the other vehicles as obtained through the first transceiver 28. The user of the signal-transmitting vehicle 1 determines whether to register the other vehicles based on the location and identification information of the other vehicles which are displayed on the display 24. Based on the information displayed on the display 24, the driver of the signal-transmitting vehicle 1 selects a vehicle to be registered and instructs the CPU 21 to register the selected vehicle through the user input interface 25. The CPU 21 stores the identification information of the vehicle 2 selected by the user into the storage memory 23. The stored identification information of the vehicle 2 is handled as identification information of the vehicle to be designated.

In steps S1 and S2, the first calling unit 20 may wait for a user input in a manner permitting the designated vehicles to be registered into different groups, and may cause the storage memory 23 to store the designated vehicles in association with the corresponding groups. The calling unit 20 may wait for a user input in a manner permitting the designated vehicles to be registered into different levels, and may cause the storage memory 23 to store the designated vehicles in association with the corresponding levels.

Figure 5:
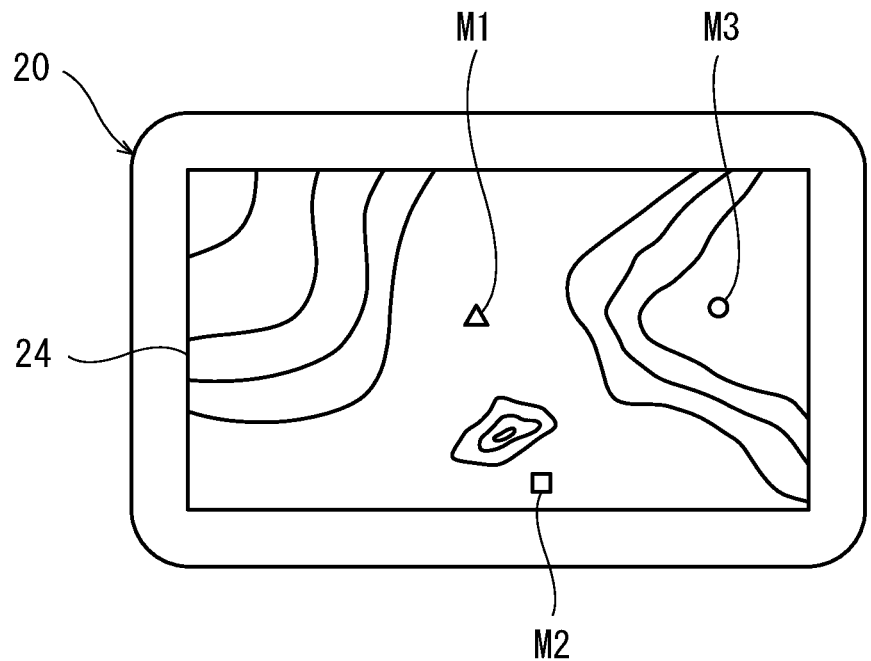
FIG. 5 shows a normal display screen of a calling unit of a signal-transmitting vehicle.

FIG. 5 shows a normal display screen of the calling unit 20 of the signal-transmitting vehicle 1. As shown in FIG. 5, when the signal-transmitting vehicle 1 is traveling in a normal state, the display 24 of the calling unit 20 displays a mark M1 indicating the location of the vehicle 1 and marks M2 and M3 indicating the locations of the other vehicles 2 and 3 on a map.

As previously described, the CPU 21 of the first calling unit 20 determines whether the specific state signal indicating that the signal-transmitting vehicle 1 is in the specific state has been obtained (step S3). Upon determining that the specific state signal has been obtained (step S3: Y), the CPU 21 of the first calling unit 20 causes the display 24 of the signal-transmitting vehicle 1 to display transmission-ready information (step S4).

Figure 6:
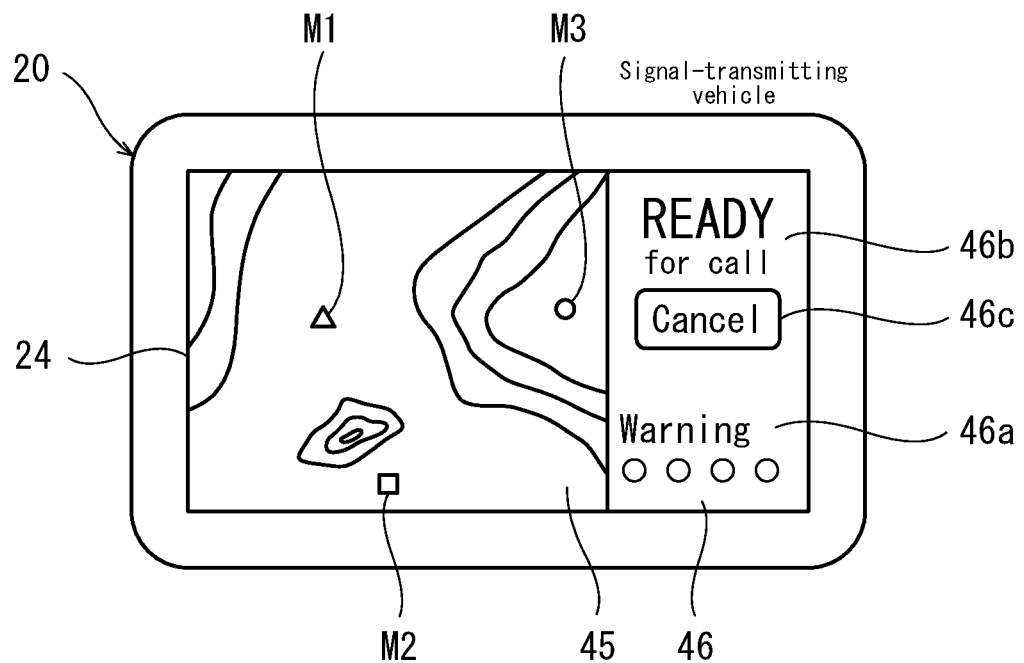
FIG. 6 shows a specific state occurrence display screen of the calling unit of the signal-transmitting vehicle.

FIG. 6 shows a specific state occurrence display screen of the calling unit 20 of the signal-transmitting vehicle 1. As shown in FIG. 6, the specific state occurrence screen of the display 24 of the calling unit 20 of the signal-transmitting vehicle 1 includes, for example, a map screen 45 and a reference screen 46. The map screen 45 is similar to the screen of FIG. 5. The reference screen 46 displays specific state information 46a indicating the content of the specific state which has occurred, such as the content of the abnormal state. The reference screen 46 displays transmission-ready information 46b. The transmission-ready information 46b is information indicating establishment of a transmission-ready state where the calling unit 20 is ready to transmit the calling signal described later. The reference screen 46 further displays a cancellation input icon 46c. By displaying the cancellation input icon 46c, the CPU 21 waits for a cancellation input provided from the user to cancel the transmission of the calling signal described later (step S5).

The CPU 21 determines whether the user input interface 25 has received the cancellation input from the user within a given period of time (step S6). Upon determining that the user has selected the cancellation input icon 46c (step S6: Y), the CPU 21 cancels the transmission of the calling signal and ends the process. Upon determining that the cancellation input has not been received (step S6: N), the CPU 21 determines whether a given period of time has elapsed after the specific state signal was obtained or the transmission-ready state began to be displayed (step S7). Upon determining that the given period of time has not elapsed (step S7: N), the CPU 21 returns to step S5. The calling unit 20 may transmit the calling signal in response to a user command before the lapse of the given period of time.

Upon determining that the given period of time has elapsed (step S7: Y), the CPU 21 of the signal-transmitting calling unit 20 chooses the destination of the calling signal to wirelessly transmit the calling signal (step S8). The CPU 21 may specify broadcast addresses as the destination to broadcast the calling signal. The CPU 21 may specify, as the destination, the one or more designated vehicles registered as candidates for signal-receiving vehicles in step S2, and need not specify any other entity as the destination. In the case where different groups each consisting of one or more designated vehicles are registered, the designated vehicle(s) belonging to a particular one of the groups may be specified as the destination.

The CPU 21 may choose the destination of the calling signal according to the content of the specific state indicated by the specific state signal. For example, the destination of a first type of calling signal to be transmitted when the content of the specific state falls into a first category and the destination of a second type of calling signal to be transmitted when the content of the specific state falls into a second category may be entirely or partially different from each other. The correspondence relationship between the content of the specific state and the category may be predetermined by the calling program. The specific state signal may contain category information. The categories may be levels or ranks.

The number of the destinations of the calling signal based on the specific state of the first category may be greater than the number of the destinations of the calling signal based on the specific state of the second category. For example, the destinations of the calling signal based on the specific state of the first category may be set to broadcast addresses, and the destinations of the calling signal based on the specific state of the second category may be set only to the designated vehicles. The content of the specific state falling into the first category may be a content indicating that the first off-road vehicle 1 is incapable of traveling. For example, the content of the specific state falling into the first category may be that the prime mover E cannot be operated due to failure or lack of fuel. The content of the specific state falling into the first category may be that a collision has been detected by a collision detection sensor. The content of the specific state falling into the first category may be that the vehicle 1 has been detected as remaining overturned for over a given period of time by a position detection sensor. The content of the specific state falling into the second category may be that failure of an accessory such as a communication device has been detected although the vehicle 1 is capable of traveling. As in this case, the specific state falling into the second category may be set to a warning state less severe than the specific state falling into the first category. The specific state falling into the second category need not be any abnormal state, and may be a state where the driver has performed an input operation for issuing a call to another vehicle.

The destination of the calling signal may be chosen according to a predetermined condition. The predetermined condition may include an environmental condition. The environmental condition may include a condition related to the ambient temperature, the weather, or a combination of them. For example, when the ambient temperature is lower than a threshold, more destinations of the calling signal may be set than when the ambient temperature is equal to or higher than the threshold. When the ambient temperature is lower than the threshold, all of the designated vehicles belonging to a particular group may be specified as the destinations of the calling signal, while when the ambient temperature is equal to or higher than the threshold, only the designated vehicle registered as the leader of the group may be specified as the destination of the calling signal. For example, in a first type of weather such as in rainy weather, foggy weather, or the dusk during which the visibility is poor, more destinations of the calling signal may be set than in a second type of weather such as in fine weather during which the visibility is good. In the first type of weather, all of the designated vehicles belonging to a particular group may be specified as the destinations of the calling signal, while in the second type of weather, only the designated vehicle registered as the leader of the group may be specified as the destination of the calling signal. The environmental condition may be other than those related to the temperature or visibility. For example, wind strength may be involved in the environmental condition.

The predetermined condition for choosing the destination of the calling signal may include a time zone condition. In a first type of time zone such as early morning or early evening during which travel-influencing factors such as temperature and visibility are unfavorable, more destinations of the calling signal may be set than in a second type of time zone such as daytime during which the travel-influencing factors are favorable. In the first type of time zone, all of the designated vehicles belonging to a particular group may be specified as the destinations of the calling signal, while in the second type of time zone, only the designated vehicle registered as the leader of the group may be specified as the destination of the calling signal.

The CPU 21 of the signal-transmitting calling unit 20 wirelessly transmits the calling signal to the chosen destination as a function of the specific state signal (step S9). The calling signal may contain location information indicating the location of the signal-transmitting vehicle 1. The calling signal may contain identification information of the signal-transmitting vehicle 1. The calling signal may contain different pieces of information according to the content of the specific state indicated by the specific state signal obtained by the CPU 21. The calling signal may contain content information indicating the content of the specific state indicated by the specific state signal.

The calling signal may contain information indicating the location of the signal-transmitting vehicle 1 as detected by the positioning sensor 26. The calling signal may contain identification information of the signal-transmitting vehicle 1. The calling signal may contain information indicating the type of the specific state. For example, the calling signal may contain information that makes it possible to distinguish whether the calling signal originates with an operation by the driver or with the abnormal state of the signal-transmitting vehicle 1. The calling signal originating with the abnormal state of the signal-transmitting vehicle 1 may contain an error code.

In the signal-transmitting calling unit 20, once the calling signal is wirelessly transmitted, the CPU 21 causes the display 24 of the signal-transmitting calling unit 20 of the signal-transmitting vehicle 1 to display information indicating completion of the wireless transmission of the calling signal (step S10). The user driving the signal-transmitting vehicle 1 can know the completion of calling signal transmission from the displayed information.

The calling signal wirelessly transmitted from the first transceiver 27 of the signal-transmitting calling unit 20 of the signal-transmitting vehicle 1 is received by the first transceiver 27 of the signal-receiving calling unit 20 of the signal-receiving vehicle 2 (step S11). In the example described here, the second off-road vehicle 2 is included in the destinations of the calling signal and receives the calling signal. The present disclosure is not limited to this example, and the third calling unit 20 of the third off-road vehicle 3 may receive the calling signal.

In the signal-receiving vehicle 2, the CPU 21 of the signal-receiving calling unit 20 having received the calling signal causes the display 24 of the signal-receiving calling unit 20 to display calling information based on the information contained in the received calling signal (step S12). The calling information displayed on the display 24 of the signal-receiving vehicle 2 includes reference information that helps to head for the signal-transmitting vehicle 1. The driver of the signal-receiving vehicle 2 can perceive the calling information by viewing the display 24 of the signal-receiving vehicle 2. The output of the calling information is not limited to visual output such as the displaying on the display 24, and may be auditory or tactile output. The user interface that outputs the calling information may be a speaker or vibrator.

Figure 7:
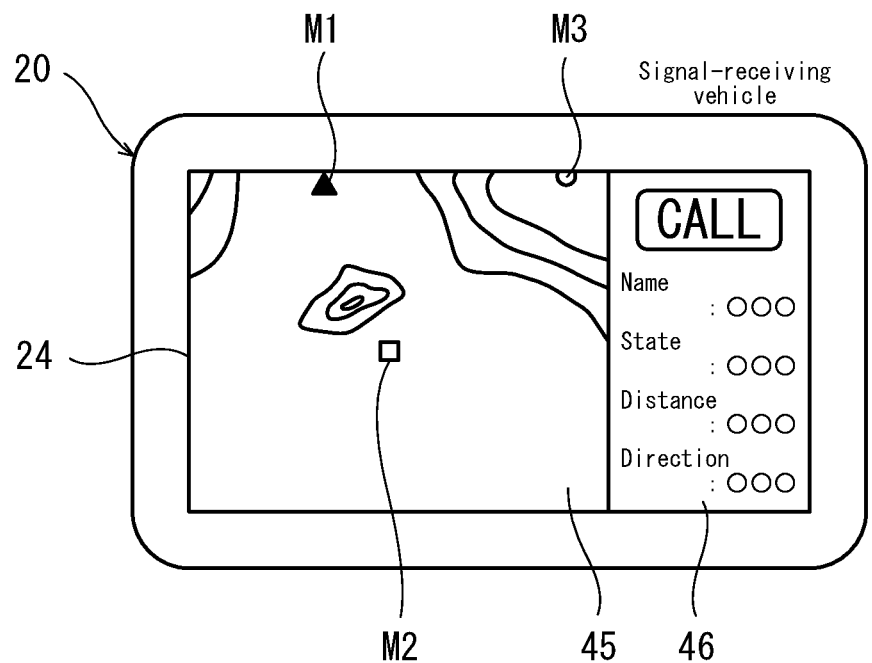
FIG. 7 shows an example of a call reception display screen of a calling unit of a signal-receiving vehicle.

FIG. 7 shows an example of a screen of the display 24 in the signal-receiving vehicle 2. As shown in FIG. 7, the screen of the display 24 of the signal-receiving vehicle 2 includes a map screen 45 and a reference screen 46. The map screen 45 displays a mark M2 indicating the location of the vehicle 2, a mark M1 indicating the location of the signal-transmitting vehicle 1, and a mark M3 indicating the location of another off-road vehicle 3 on a map. The mark M1 representing the signal-transmitting vehicle 1 which is the source of the calling signal may be referred to as "signal-transmitting vehicle mark".

The signal-receiving calling unit 20 displays the signal-transmitting vehicle mark M1 in a manner different from a normal manner of display. In the manner of display different from the normal manner of display, the signal-transmitting vehicle mark M1 may be highlighted. For example, the signal-transmitting vehicle mark M1 representing the source of the calling signal may be displayed in a manner including blinking, color change, enlargement, and/or brightness change. The change in the manner of displaying the signal-transmitting vehicle mark M1 is an example of the calling information. The location of the signal-transmitting vehicle mark M1 displayed on the map screen 45 is an example of the reference information that helps to head for the signal-transmitting vehicle 1.

The reference screen 46 displays the reference information related to the signal-transmitting vehicle 1 and contained in the calling signal. The reference information includes the name of the user of the signal-transmitting vehicle 1, the content of the specific state of the signal-transmitting vehicle 1, the distance from the signal-receiving vehicle 2 to the signal-transmitting vehicle 1, the direction of the signal-transmitting vehicle 1 with respect to the signal-receiving vehicle 2, or any combination of these pieces of information. The distance and direction are examples of the reference information that helps to head for the signal-transmitting vehicle 1.

Since the location of the signal-transmitting vehicle 1, the direction of the signal-transmitting vehicle 1, the distance to the signal-transmitting vehicle 1, or any combination of these pieces of information is displayed on the calling unit 20 of the signal-receiving vehicle 2, the driver of the signal-receiving vehicle 2 can easily reach the signal-transmitting vehicle 1. Since the abnormal state or comments concerning the signal-transmitting vehicle 1 are displayed on the calling unit 20 of the signal-receiving vehicle 2, the driver of the signal-receiving vehicle 2 can easily take necessary actions. The calling unit 20 of the signal-receiving vehicle 2 may automatically send to the calling unit 20 of the signal-transmitting vehicle 1 a reception confirmation signal indicating that the calling signal has been received. Upon receiving the reception confirmation signal, the calling unit 20 of the signal-transmitting vehicle 1 may cause the display 24 to display reception confirmation information indicating that the calling unit 20 of the signal-receiving vehicle 2 has received the calling signal. The reception confirmation signal may contain identification information of the signal-receiving vehicle 2. The calling unit 20 of the signal-transmitting vehicle 1 having received the reception confirmation signal may display the source of the reception confirmation signal in a manner permitting identification of the source.

Figure 8:
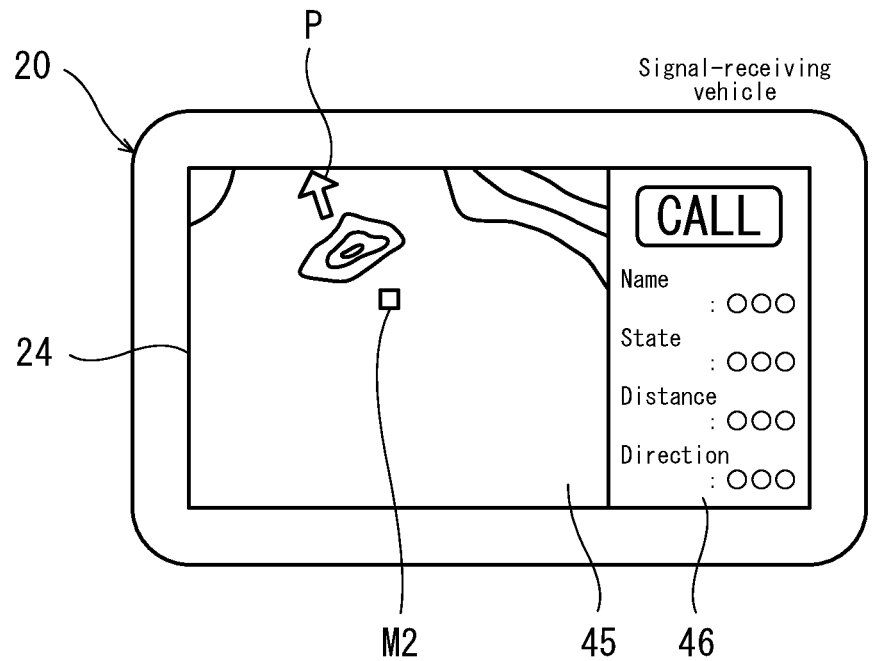
FIG. 8 shows another example of the call reception display screen of the calling unit of the signal-receiving vehicle.

FIG. 8 shows another example of the screen of the display 24 in the signal-receiving vehicle 2. In the example of FIG. 8, the signal-transmitting vehicle 1, which is the source of the calling signal, is outside the display range of the map screen 45. In this case, the map screen 45 may display an arrow P indicating the direction of the signal-transmitting vehicle 1 with respect to the signal-receiving vehicle 2. The arrow P may be displayed in a highlighted manner; for example, the arrow P may blink or be displayed with high brightness. The arrow P is an example of the calling information and also an example of the reference information that helps to head for the signal-transmitting vehicle 1.

The driver of the signal-receiving vehicle 2 can inform the signal-transmitting vehicle 1 which is the source of the calling signal that the driver has perceived the calling information output by the display 24 of the signal-receiving vehicle 2. Specifically, the driver of the signal-receiving vehicle 2 can input a callback command by operating the user input interface 25 of the calling unit 20 of the signal-receiving vehicle 2 (step S13). Upon determining that the callback command has been input (step S13: Y), the calling unit 20 of the signal-receiving vehicle 2 wirelessly transmits a callback signal from the first transceiver 27 to the destination, i.e., the calling unit 20 of the signal-transmitting vehicle 1 (step S14). Along with this transmission, the calling unit 20 of the signal-receiving vehicle 2 may transmit another piece of information from the second or third transceiver 28 or 29 to the server 41, the other piece of information indicating that the callback signal has been wirelessly transmitted.

The calling unit 20 of the signal-transmitting vehicle 1 receives the callback signal wirelessly transmitted from the calling unit 20 of the signal-receiving vehicle 2 (step S15). Upon receiving the callback signal, the calling unit 20 of the signal-transmitting vehicle 1 causes the display 24 to display callback information (step S16). By viewing the callback information displayed on the display 24 of the signal-transmitting vehicle 1, the driver of the signal-transmitting vehicle 1 can know that another user has perceived the calling information and provided a response.

The output of the callback information is not limited to visual output such as displaying on the display 24, and may be auditory or tactile output. The callback information includes information indicating that the other user has perceived the calling information and provided a response. The output of the callback information may be displaying of a mark representing the callback. The output of the callback information may include displaying of information indicating the source of the callback signal.

After transmitting the calling signal (step S9), the calling unit 20 of the signal-transmitting vehicle 1 may repeat the wireless transmission of the calling signal periodically until receiving the callback signal. The transmission-to-transmission interval in the periodic calling signal transmission may be constant or variable. Upon receiving the callback signal, the calling unit 20 of the signal-transmitting vehicle 1 may end the periodic wireless transmission of the calling signal.

In the foregoing description, the vehicle that transmits the calling signal and receives the callback signal is the first off-road vehicle 1, while the vehicle that receives the calling signal and transmits the callback signal is the second off-road vehicle 2. The relationship between the first and second off-road vehicles 1 and 2 may be reversed. That is, the signal-transmitting vehicle 1 has the function of acting as a signal-receiving vehicle, and the signal-receiving vehicle 2 has the function of acting as a signal-transmitting vehicle. Specifically, in the case where the calling unit 20 of the second off-road vehicle 2 acting as a signal-transmitting vehicle transmits the calling signal and the calling unit 20 of the first off-road vehicle 1 acting as a signal-receiving vehicle receives the calling signal, the display 24 of the first off-road vehicle 1 displays the calling information as a function of the calling signal. In the case where the calling unit 20 of the first off-road vehicle 1 transmits the callback signal and the calling unit 20 of the second off-road vehicle 2 receives the callback signal, the display 24 of the second off-road vehicle 2 displays the callback information as a function of the callback signal.

Figure 9:
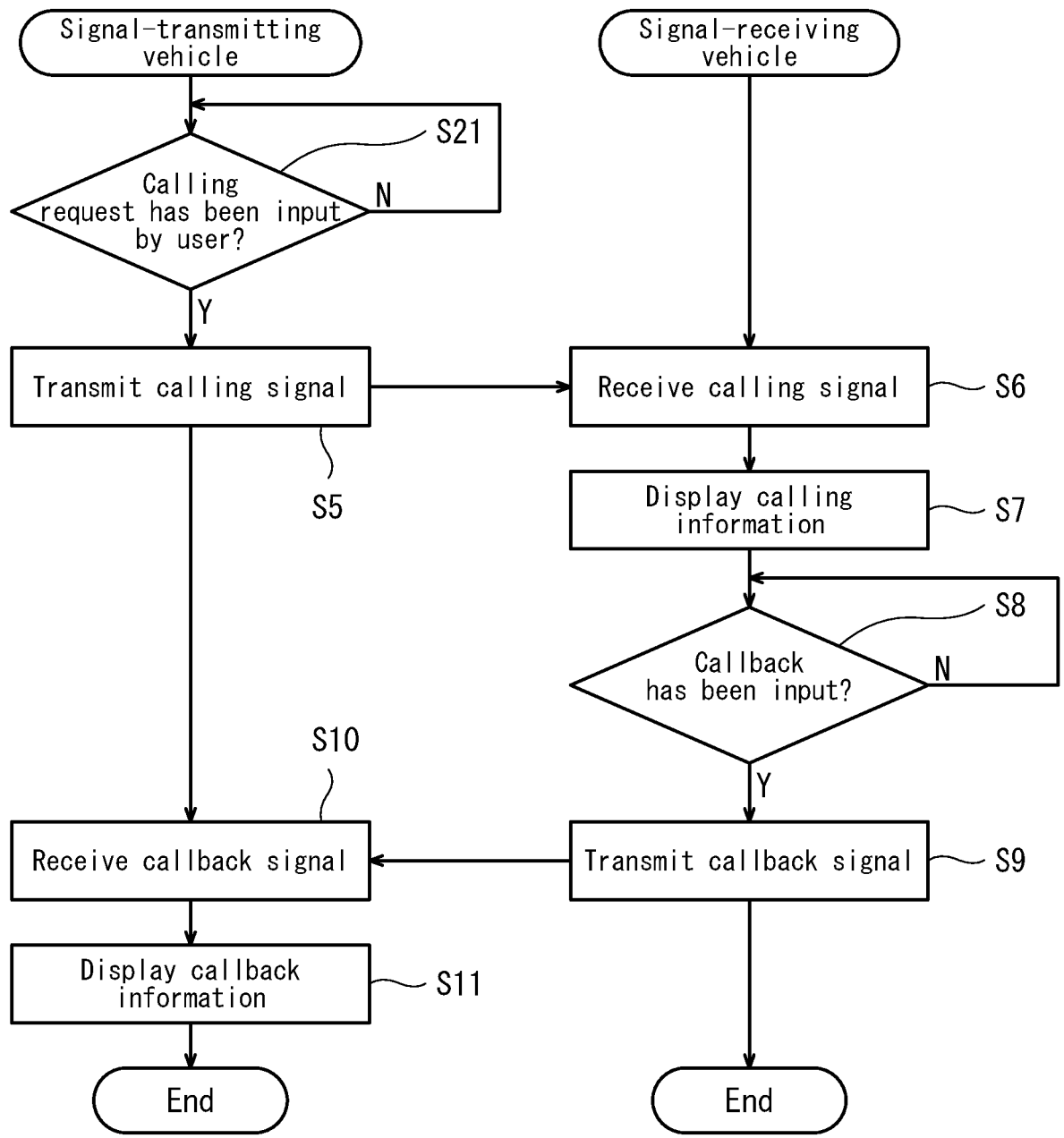
FIG. 9 is a flowchart illustrating another process of the calling system of FIG. 3.

FIG. 9 is a flowchart illustrating another process of the calling system 100 of FIG. 3. In the process of FIG. 9, an operation as a trigger for calling signal transmission is manually performed. In FIG. 9, the steps which are the same as those shown in FIG. 4 are denoted by the same reference signs. As shown in FIG. 9, the calling unit 20 of the signal-transmitting vehicle 1 waits for a calling request input by the user. The calling unit 20 of the signal-transmitting vehicle 1 determines whether the calling request has been input through the user input interface 25 (step S21). Upon determining that the calling request has been input by the driver of the signal-transmitting vehicle 1 (step S21: Y), the calling unit 20 of the signal-transmitting vehicle 1 generates and wirelessly transmits the calling signal (step S5). The subsequent procedures are the same as those in the example described with reference to FIG. 4, and will therefore not be described again.

The flowcharts shown in FIGS. 4 and 9 are merely examples. The order of the steps may be changed, and some of the steps may be skipped. In FIG. 4, the displaying of the transmission-ready information (step S4) and the cancellation input (steps S5 and S6) may be skipped. Upon obtaining the specific state signal, the calling unit 20 of the signal-transmitting vehicle 1 may proceed to the transmission process without waiting for the driver to provide an instruction to transmit the calling signal. The destination of the calling signal need not be changed according to the content of the specific state signal and may remain the same regardless of the content of the specific state. The transmission and reception of the callback signal may be skipped. The condition for calling signal transmission may or may not include reception of the instruction from the user.

The destination of the calling signal may be set according to who is the driver of the signal-transmitting vehicle 1. For example, in the case where the driver of the signal-transmitting vehicle 1 is a driver for whom the output power of the vehicle is to be limited (an example of such a driver is a beginner), the choice of destinations of calling signal transmission may be wider than in the case where the driver of the signal-transmitting vehicle 1 is not subject to such a limitation. Whether there is an output power limitation imposed according to the type of the driver may be determined by identifying the type of the key with which the vehicle is equipped. Additionally or alternatively, destinations appropriate for the driver may be set by inputting the years of experience or the age of the driver to the user input interface 25.

A part or all of the calling program may be executed by the portable information terminal 40 carried by the driver instead of being executed by the calling unit 20. In this case, the functions of the display and CPU can be achieved by the display and CPU of the portable information terminal 40. For example, in the case where the program is executed by the CPU of the portable information terminal 40, the vehicle is equipped with a transceiver for communication with other vehicles, and the use of this transceiver enables two-way communication with the other vehicles beyond the range of electric wave reception of a base station.

In the case where the portable information terminal 40 or third transceiver 29 can communicate with the server 41 via a base station, a part or all of the calling program may be executed by the server 41 rather than by the calling unit 20 or portable information terminal 40. In the case where the server 41 executes the program for calling signal transmission, the server 41 can transmit the calling signal to a wide variety of receiving devices via a public network or the Internet. A part or all of the calling program may be executed by an ECU mounted on an off-road vehicle in which the calling unit 20 is installed. For example, allowing the ECU 31 of the off-road vehicle to serve the function of the CPU 21 of the calling unit 20 eliminates the need for a CPU dedicated for the calling process and leads to easy reduction of the number of required components.

Although in the example described above the signal-receiving vehicle 2 receives the calling signal, a portable terminal carried by another vehicle driver may have the same function as the calling unit of the signal-receiving vehicle. In this case, the other vehicle driver can know that the calling signal has been transmitted, and the number of candidate recipients can be increased. The server 41 may receive the calling signal from the signal-transmitting vehicle 1 via a base station and transmit the calling signal to a wide variety of recipients. The intervention of the server 41 makes it possible to transmit the calling signal to many receiving devices connected to the server 41 and let various people perceive the calling signal. The calling unit 20 may be installed in an onshore facility. This allows a person in the onshore facility to perceive the calling signal.

In the configuration described above, the calling signal indicating that the signal-transmitting vehicle 1 is in the predetermined specific state and containing the location information of the signal-transmitting vehicle 1 is wirelessly transmitted. Thus, the occurrence of the specific state of the signal-transmitting vehicle 1 and the location of the signal-transmitting vehicle 1 can be communicated to the drivers of the other vehicles 2 and 3 distant from the signal-transmitting vehicle 1. This makes it possible for the drivers of the signal-receiving vehicles 2 and 3 to know the occurrence of the specific state of the signal-transmitting vehicle 1 even when the vehicles are in a vast area of rough terrain devoid of any defined routes. In particular, even in case that the vehicles are in a forest or rocky area where there are many obstacles and the signal-transmitting vehicle 1 is out of the sight of the drivers of the signal-receiving vehicles 2 and 3, the drivers of the signal-receiving vehicles 2 and 3 can easily know the occurrence of the specific state of the signal-transmitting vehicle 1. This can reduce the time taken for the signal-receiving vehicles 2 and 3 to reach the signal-transmitting vehicle 1. The wireless transmission of the calling signal can be accomplished using a wireless technology that allows a wireless signal to be delivered directly to a wireless communicator located within a given range of communication without intervention of any base station (an example of such a technology is RF communication). Thus, the recipients of the calling signal can be limited to those who are within a given area.

The calling signal can contain type information indicating the type of the specific state. Thus, the drivers of the signal-receiving vehicles 2 and 3 can easily know the type of the specific state of the signal-transmitting vehicle 1 before heading for the signal-transmitting vehicle 1. The drivers of the signal-receiving vehicles 2 and 3 who have known the content of the specific state of the signal-transmitting vehicle 1 can guess the situation that the signal-transmitting vehicle 1 is in and can take appropriate actions. For example, when the calling signal contains, as the content of the specific state, an error code indicating the cause of the abnormal state, recovery from the abnormal state can be facilitated. For example, when the information indicating the specific state includes fuel shortage, the drivers of the signal-receiving vehicles 2 and 3 can prepare reserve fuel before heading for the signal-transmitting vehicle 1. When the information indicating the specific state includes an abnormality of a particular electric part, the drivers of the signal-receiving vehicles 2 and 3 can prepare a necessary tool or replacement part before heading for the signal-transmitting vehicle 1. When the information indicating the specific state includes the absence of abnormalities, the drivers of the signal-receiving vehicles 2 and 3 can head for the signal-transmitting vehicle 1 without preparing equipment needed to address the abnormal state.

The type information can contain information indicating operation failure of the signal-transmitting vehicle 1 or information indicating that the signal-transmitting vehicle 1 has remained overturned for over a given period of time. Thus, the occurrence of the trouble can easily be communicated to another person who is capable of helping to solve the trouble. This provides improved convenience.

The calling signal can contain the identification information of the signal-transmitting vehicle 1. Thus, the signal-transmitting vehicle 1 which is in the specific state can easily be identified. The outputting the identification information includes outputting unique information related to the identification information (examples of the unique information include the owner name, type, manufacturer name, and color of the vehicle).

The display 24 of the first off-road vehicle 1 can output information indicating completion of the wireless transmission of the calling signal. Thus, the user driving the first off-road vehicle 1 can know the completion of calling signal transmission, and this provides improved convenience.

The transmission of the calling signal can be canceled in case that the user of the first off-road vehicle 1 provides a cancellation input after the obtainment of the abnormal state signal and before the transmission of the calling signal. Thus, unintended transmission of the calling signal can be prevented.

The calling information to be output by the display 24 of the calling unit 20 of the second off-road vehicle 2 can contain information that helps to head for the first off-road vehicle 1 (examples of the information include location, direction, and distance). Thus, the user driving the second off-road vehicle 2 can easily head for the first off-road vehicle 1.

The designated vehicles can be chosen as the destinations of the calling signal. Thus, selective calling signal transmission can be achieved in which the calling signal is wirelessly transmitted only to wireless communicators of a limited number of relevant people (e.g., the group members or group leader).

The destination of the calling signal can be chosen according to a predetermined condition such as that related to the content of the specific state, the time zone, or the environment (e.g., ambient temperature). Thus, the destination of the calling signal can be varied according to the factors as mentioned above to achieve selective calling signal transmission.

The specific state signal can contain the content information indicating the content of the abnormal state, and the destination of the calling signal can be changed according to the content information. For example, when the first off-road vehicle 1 is in a first abnormal state, the calling signal can be transmitted only to the designated vehicles, while when the first off-road vehicle 1 is in a second abnormal state, the calling signal can be transmitted without limiting the destination of the calling signal to the designated vehicles. Thus, the calling can be optimized according to the significance of the abnormal state, and an unnecessary increase in the chance of calling signal reception can be prevented.

The calling signal can be wirelessly transmitted in response to a user input. Thus, transmission of the calling signal can be achieved manually without the need for the calling unit 20 to automatically transmit the calling signal, and this provides improved convenience. For example, transmission of the calling signal can be accomplished at a time when the user wants to transmit the calling signal, and this provides improved convenience.

The callback information can be displayed on the display 24 upon reception of the callback signal as a response to the calling signal. Thus, the user driving an off-road vehicle can know that another off-road vehicle or any other entity has received the calling signal. This provides improved convenience. For example, by knowing the reception by the signal-receiving vehicle, the driver of the signal-transmitting vehicle 1 can take actions based on the fact of the reception. Specifically, the driver of the signal-transmitting vehicle 1 can more easily decide whether to stay or move.

After the calling signal is wirelessly transmitted, the wireless transmission of the calling signal can be repeated periodically until reception of the callback signal in order to encourage the other off-road vehicles 2 and 3 to transmit the callback signal. This can increase the chance of calling signal reception, thus making it easier to inform other people of the presence of the vehicle 1 which is in the specific state. After the calling unit 20 of the signal-transmitting vehicle 1 receives the callback signal, the frequency of retransmission of the calling signal by the signal-transmitting vehicle 1 may be reduced, or the retransmission may be ended.

Although the calling system 100 has been described as including the calling unit 20 in which elements involved in the calling are accommodated in one housing, the calling system 100 is not limited to this configuration. For example, the elements involved in the calling may be located away from one another and electrically connected in a manner permitting communication between them. The first transceiver 27 and positioning sensor 26 may be mounted at locations suitable for electric wave reception. The display 24 may be mounted at a location that allows the driver assuming a driving position to view the display 24.

A part of the calling unit 20 may be installed in the vehicle as standard equipment. For example, a positioning sensor installed in the vehicle as standard equipment may be used as the positioning sensor 26. Likewise, an instrument panel installed in the vehicle as standard equipment may be used as the display 24. The number of components additionally used in the vehicle to construct the calling system 100 can be reduced by embodying the calling system 100 using components installed in the vehicle as standard equipment.

The calling unit 20 may be an accessory removably mounted on the vehicle. This allows for easy repair or replacement of the calling unit 20 in the event of failure. With the calling unit 20 being a removably mounted accessory, the structure of the vehicle can be the same for the case where the calling system 100 is unnecessary and the case where the calling system 100 is used.

Although in the present embodiment the calling signal can contain not only the information indicating the specific state but also other pieces of information such as the location information, the calling signal may contain only the information indicating the specific state. The destination of the calling signal need not be selected, and the calling signal may be transmitted to all of communication partners with which the vehicle can establish two-way communication. The specific state described above is merely an example, and the specific state may include another state in regard to which transmission of the calling signal is preferred. For example, the calling signal may be transmitted to request other vehicles to come to the location of the signal-transmitting vehicle or a designated location. The calling signal may be intended to deliver some kind of information to the other vehicles.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the present disclosure, the circuitry, units, or means are hardware that carry out or are programmed to perform the recited functionality. The hardware may be any hardware disclosed herein or otherwise known hardware which is programmed or configured to carry out the recited functionality. When the hardware is a processor which may be considered a type of circuitry, the circuitry, means, or units are a combination of hardware and software, the software being used to configure the hardware and/or processor.

The above embodiment has been described to illustrate the technology disclosed in the present application. The technology of the present disclosure is not limited to the above embodiment, and is applicable also to embodiments obtained by making appropriate modifications, replacements, additions, and/or omissions to the above embodiment. The elements described in the above embodiment may be combined to form other embodiments. For example, one or more elements or a method in one embodiment may be used in another embodiment. One or more elements in an embodiment may be arbitrarily extracted separately from the other elements in the embodiment. For the purpose of illustrating the technology, the elements disclosed in the attached drawings and the detailed description include not only elements essential for problem solution but also elements inessential for problem solution.

What is claimed is:

1. A calling system for off-road vehicles, comprising processing circuitry, the processing circuitry being configured to:
    obtain location information indicating a location of a first off-road vehicle;
    obtain a specific state signal indicating that the first off-road vehicle is in a given specific state; and
    enter a transmission-ready state in which a first wireless communicator of the first off-road vehicle is ready to, based on the specific state signal, wirelessly transmit a calling signal containing the location information, wherein the wireless transmission of the calling signal by the first wireless communicator is performed using a wireless communication technology in which the calling signal transmitted from the first wireless communicator is received directly by a second wireless communicator of a second off-road vehicle,
    the processing circuitry being further configured to cancel the transmission of the calling signal upon receiving a cancellation input.

2. The calling system according to claim 1, wherein the calling signal contains type information indicating a type of the specific state.

3. The calling system according to claim 2, wherein the type information includes information indicating operation failure of the first off-road vehicle, information indicating that the first off-road vehicle has remained overturned for over a given period of time, or information indicating that a level of an energy source for a prime mover of the first off-road vehicle is below a given value.

4. The calling system according to claim 1, wherein the calling signal contains identification information of the first off-road vehicle.

5. The calling system according to claim 1, wherein the processing circuitry is further configured to cause a user interface of the first off-road vehicle to output information indicating completion of the wireless transmission of the calling signal.

6. The calling system according to claim 1, wherein
    the processing circuitry is further configured to:
        cause a user output interface to output transmission-ready information indicating establishment of the transmission-ready state upon determining that the specific state signal has been obtained; and
        after obtaining the specific state signal and before transmitting the calling signal, wait for the cancellation input for cancellation of the transmission of the calling signal; wherein:
        cancelling the transmission of the calling signal includes cancelling the transmission of the calling signal upon receiving the cancellation input within a given period of time while waiting for the cancellation input; and
        the wireless transmission of the calling signal by the first wireless communicator is performed in case that the given period of time elapses without reception of the cancellation input while the processing circuitry is waiting for the cancellation input.

7. The calling system according to claim 1, wherein
    the calling signal is a first calling signal,
    the processing circuitry is further configured to:
        wirelessly receive a second calling signal from the second off-road vehicle; and
        cause a user interface to output calling information based on the second calling signal, the calling information being perceivable by a user driving the first off-road vehicle, and
    the calling information includes information that helps to head for the second off-road vehicle.

8. The calling system according to claim 1, wherein
    the specific state signal contains content information indicating a content of the specific state, and
    the choosing the destination includes changing the destination according to the content information.

9. The calling system according to claim 1, wherein the processing circuitry is further configured to:
    receive a user input that commands the processing circuitry to transmit the calling signal; and
    wirelessly transmit the calling signal in response to the user input.

10. The calling system according to claim 1, wherein the processing circuitry is further configured to:
    receive a callback signal as a response to the calling signal; and
    upon receiving the callback signal, cause a user interface to output callback information perceivable by a user driving the first off-road vehicle.

11. The calling system according to claim 10, wherein the processing circuitry is further configured to, after wirelessly transmitting the calling signal, repeat the wireless transmission of the calling signal periodically until receiving the callback signal.

12. The calling system according to claim 1, wherein the processing circuitry is further configured to, upon wirelessly transmitting a calling signal, inform a driver of the wireless calling signal transmission using a user output interface.

13. The calling system according to claim 1, wherein the specific state is:
a state where a level of an energy source for a prime mover of the first off-road vehicle is below a given value,
an abnormal state of the first off-road vehicle, or
a state where control for limiting an output of the prime mover has been carried out to address the abnormal state of the first off-road vehicle.

14. The calling system according to claim 1, wherein:
the specific state includes an abnormal state of the first off-road vehicle, and
the calling signal includes information indicating a type of the abnormal state.

15. The calling system according to claim 1, wherein the processing circuitry is further configured to choose a destination of the calling signal according to a predetermined condition, the predetermined condition including an environmental condition or a time zone condition.

16. A calling system for off-road vehicles, comprising processing circuitry, the processing circuitry being configured to:
receive a user input that commands the processing circuitry to register other off-road vehicles as group members;
obtain location information indicating a location of a first off-road vehicle;
obtain a specific state signal indicating that the first off-road vehicle is in a given specific state; and
cause a first wireless communicator of the first off-road vehicle to, based on the specific state signal, wirelessly transmit, only to the group members, a calling signal containing the location information, wherein the wireless transmission of the calling signal by the first wireless communicator is performed using a wireless communication technology in which the calling signal transmitted from the first wireless communicator is received directly by a second wireless communicator of a second off-road vehicle.

17. The calling system according to claim 16, wherein the number of destinations of the calling signal based on the specific state falling into a first category is greater than the number of one or more destinations of the calling signal based on the specific state falling into a second category.

18. A calling system mounted on a first off-road vehicle, comprising:
a display that displays a screen; and
processing circuitry configured to:
wirelessly receive a calling signal from a second off-road vehicle being in a trouble state or an abnormal state, the calling signal containing location information indicating a location of the second off-road vehicle;
cause the screen to display a mark indicating the location of the second off-road vehicle based on the calling signal; and
cause the screen to display an arrow indicating a direction of the location of the second off-road vehicle.

19. The calling system according to claim 18, wherein:
the screen is a map screen; and
the processing circuitry configured to cause the map screen to display the arrow indicating the direction of the location of the second off-road vehicle with respect to a location of the first off-road vehicle when the second off-road vehicle is outside a display range of the map screen.

* * * * *